United States Patent
Prieditis

(10) Patent No.: US 9,697,476 B1
(45) Date of Patent: Jul. 4, 2017

(54) SYSTEM AND METHOD FOR UTILIZING A MODEL TO PROCESS BIG DATA

(71) Applicant: Neustar, Inc., Sterling, VA (US)

(72) Inventor: Armand Prieditis, Arcata, CA (US)

(73) Assignee: Neustar, Inc., Sterling, VA (US)

( * ) Notice: Subject to any disclaimer, the term of this patent is extended or adjusted under 35 U.S.C. 154(b) by 273 days.

(21) Appl. No.: 14/276,876

(22) Filed: May 13, 2014

(51) Int. Cl.
 *G06N 99/00* (2010.01)
(52) U.S. Cl.
 CPC .................................. *G06N 99/005* (2013.01)
(58) Field of Classification Search
 None
 See application file for complete search history.

(56) References Cited

PUBLICATIONS

Tveit, Parallel Machine Learning for Hadoop/Mapreduce—A Python Example [online], Jun. 17, 2010[retrieved on Apr. 21, 2016]. Retrieved from the Internet:<URL: http%3A%2F%2Fatbrox.com%2F2010%F02%2F08%2Fparallel-machine-learning-for-hadoopmapreduce-a-python-example%2F&usg=AFQjCN-EiHDrH43AMGJIHk-SqDCoZk2HM_w>.*

* cited by examiner

*Primary Examiner* — Lut Wong
(74) *Attorney, Agent, or Firm* — Mahamedi IP Law LLP

(57) ABSTRACT

A model is implemented that includes one or more classes. For each of the one or more classes of the model, a set of input variables of the big data set are represented as a matrix with non-zero values only provided as diagonal entries. A most likely class for each input variable is determined based at least in part on inverting the matrix. One or more predictions are determined for one or more output variables based at least in part on the most likely class of one or more input variables from the set of input variables.

13 Claims, 4 Drawing Sheets

SYSTEM AND METHOD FOR UTILIZING A MODEL TO PROCESS BIG DATA

TECHNICAL FIELD

Examples described herein relate a system and method for utilizing a model to process big data.

BACKGROUND

Humans are producing an estimated 1.8 zettabytes of data annually (a zettabyte is $10^{21}$ bytes), which would take roughly 60 billion iPads to store, and this amount is doubling every year. Machine learning is increasingly used to process such data. In general terms, a machine learner is to produce a model that can then be used to predict one or more outputs from one or more inputs.

The term "big data" is a characterization of data sets that are both tall, because of an enormous number of rows, and wide, because of an enormous number of columns. Researchers have developed parallel distributed architectures such as Hadoop to facilitate machine learning on tall data based on splitting the data into several shorter data sets, each of which can be processed independently and in parallel, and then combining the results of that processing. In Hadoop terminology, that method is called Map-Reduce: the Mappers split the data so that it can be processed in parallel and the Reducers combine the results of the processing. For example, many machine learning algorithms require the calculation of a mean (average) of a column. Hadoop's Mappers can split the original data into several parts, calculate the sum of the column for each split; Hadoop's Reducers can combine the sums of each column into a grand-total sum, from which the average can easily be calculated. While architectures such as Hadoop can be effective for machine learning tall data, they are not specifically aimed at machine learning with wide data.

DETAILED DESCRIPTION

Figure 1:
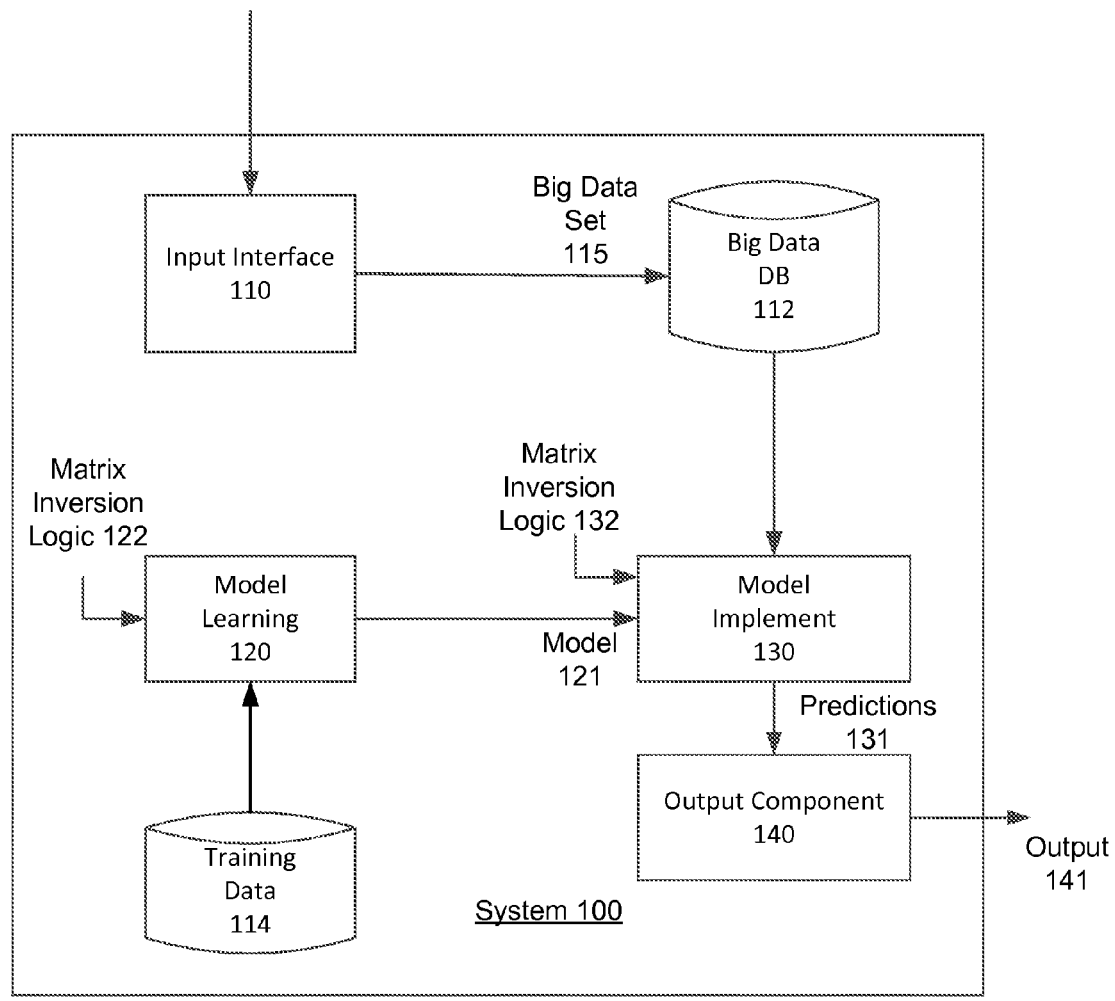
FIG. 1 illustrates a system and method for utilizing a model to process a big data set, according to one or more embodiments.

Examples described herein include a system and method for utilizing a model to analyze big data sets. In particular, some embodiments define classes for a model, and further utilize statistical analysis in order to determine the most likely classes for modeling rows or other portions of the data sets.

Examples described herein include a system and method for determining one or more predictions for a big data set. At least a portion of the big data set is received. A model is implemented that includes one or more classes. For each of the one or more classes of the model, a set of input variables of the big data set are represented as a matrix with non-zero values only provided as diagonal entries. A most likely class for each input variable is determined based at least in part on inverting the matrix. One or more predictions are determined for one or more output variables based at least in part on the most likely class of one or more input variables from the set of input variables.

Another example provides for developing a model for analyzing a big data set. In one implementation, a set of classes are determined for a model. A most likely class is determined for a set of training data. The determination of the most likely class includes (i) representing, for each of the one or more classes of the model, a set of input variables of the model as a matrix with non-zero values only provided as diagonal entries, and (ii) inverting the matrix. One or more input variables of the model are updated using the set of training data and the most likely class is determined for the training data.

Among other achievements, examples described herein provide a machine learning solution for handling big data sets. Still further, examples described herein can be used in parallel distributed architectures (e.g., Hadoop) so the machine learning can be facilitated with data that is both tall and wide. The ability to implement machine-learning using big data sets has applications in various technology fields, such as geolocation, malicious website detection, distributed denial of service detection, collaborative filtering, fraud detection, authentication and targeted advertising.

Examples recognize that prior approaches to machine learning are computationally expensive and impractical for many applications. For example, prior approaches sometimes employ a multivariate normal model which requires an $O(n3)$ inversion of a covariance matrix for learning and prediction, where n is the number of columns. In these approaches, when n is larger than 1000, a matrix inversion requires more than a billion operations. For example, in a collaborative filtering application, n might be the number of users, which can easily number in the millions for a web-based application, in which case prediction with a multivariate normal distribution is simply not feasible.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, and network-enabled devices (e.g. portable devices such as cell phones) are all examples of machines and devices that use processors, memory, and instructions stored on computer-readable mediums.

System Overview

FIG. 1 illustrates a system and method for utilizing a model to process a big data set, according to one or more embodiments. An example system 100 such as shown with FIG. 1 can be implemented in a variety of computing environments. In one implementation, system 100 can be provided as a network service which receives data sets as inputs from sources such as other programmatic components or computing sources. In a variation, the system 100 can be implemented on a terminal that operates in a stand-alone environment, or in a combination of terminals that operate over peer or direct connections. Still further, system 100 can be implemented in a shared computing environment, such as, for example, between server and client terminals.

In an example of FIG. 1, system 100 includes an input interface 110, a model learning component 120, and a model implement component 130. The input interface 110 communicates with programmatic and/or computing sources in order to obtain data 111. The data 111 can be collected as part of a big data set 115, which in the example of FIG. 1 is stored in a big data database 112. By way of example, data 111 can be obtained from numerous sources, and used in (i) tracking geographic location of millions (or billions) devices and numerous instances over the duration of time; (ii) monitoring web traffic, such as access to a particular website from a population of users, where webpages are downloaded, for example, billions of times; and (iii) tracking click-thrus for websites and advertisements. A characteristic of the big data set 115 includes the size of the number of rows and columns that comprise the big data set. In particular, the big data set 115 can be wide, comprising a number of columns that exceeds an order of three (e.g., $10^5$ columns, $10^8$ columns).

Figure 2:
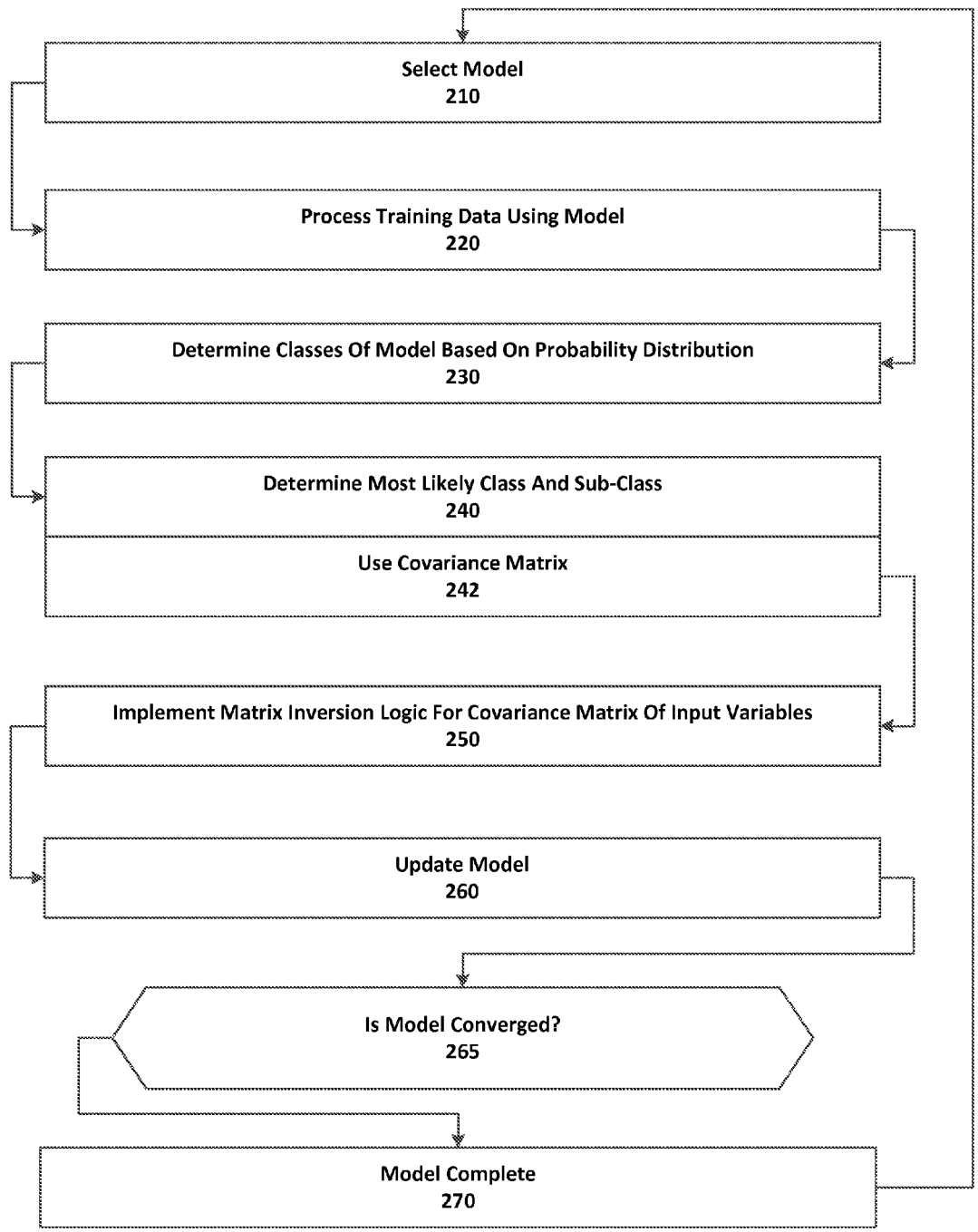
FIG. 2 illustrates an example method for developing a model for analyzing big data sets, according to one or more embodiments.

The model learning component 120 can implement machine learning techniques in order to develop a model 121 for analyzing the big data set 115. FIG. 2 illustrates an example of a method for developing model 121 to handle big data sets for a variety of purposes. As described with an example of FIG. 2, model learning component 120 can utilize training data 114 in order to define the model 121 comprising multiple classes or subclasses. The model implement component 130 can utilize the model 121 in order to analyze the big data set 115. While an example provides for model 121 to be developed through a process such as described with FIG. 2, in variations, alternative model and machine learning processes can be used to develop the model 121.

Figure 3:
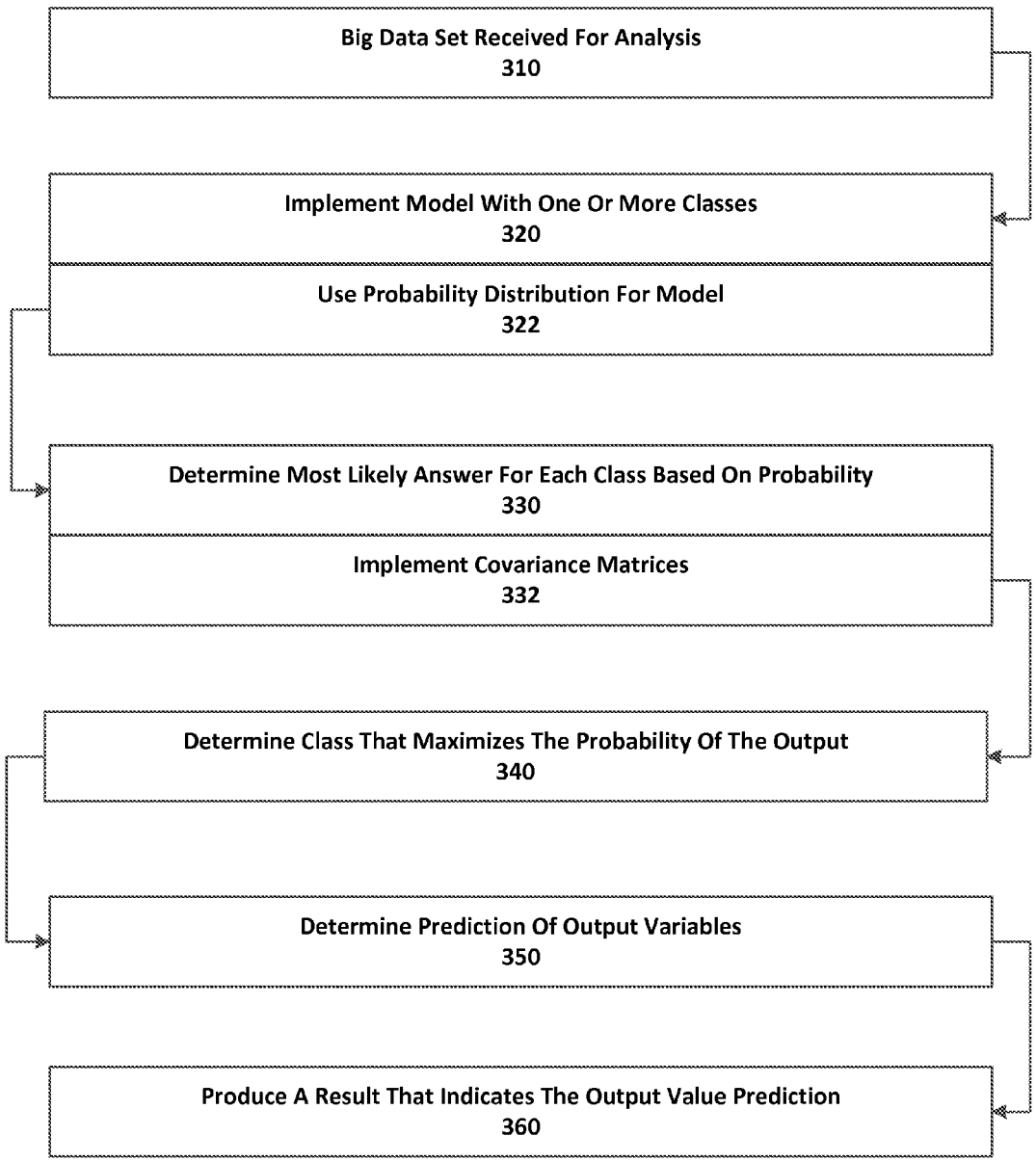
FIG. 3 illustrate an example method for utilizing a model to determine predictions for input variables provided with a big data set, according to one or more embodiments.

The model implement component 130 receives the model 121, and further uses the model 121 to analyze and process the portions (e.g., rows) of the big data set 115. FIG. 3 illustrates an example of a method for utilizing model 121 to analyze big data sets. As described with an example of FIG. 3, the model implement component 130 can use a process that analyzes portions (e.g., rows) of the big data set 115, and further selects a most probable sub class of the model 121 for purpose of analyzing the specific portion.

Still further, some embodiments provide that one or both of the model learning component 120 and model implement component 130 to use matrix inversion logic 122, 132 respectively, in order to develop and implement the model 121 for big data sets. The model learning component 120 can use matrix inversion logic 122 in connection with training data 114 for purpose of developing the model 121. The model implement component 130 can use the matrix inversion logic 132 in order to manipulate the big data set 115 for purpose of implementing the model 121, and determining one or more outcomes based on the model 121 as applied to the big data set 115. As described with examples of FIG. 2 and FIG. 3, each of the matrix inversion logic 122, 132 can include analyzing the relevant matrix using assumptions, in order to maximize probability determinations that are based on the inversion of the input matrix (from training data 114 or big data set 115).

Among other analyses that can be performed, the model implement component 130 can generate a set of predictions 131 from applying the model 121 to the big data set 115. An output component 140 can generate an output 141 that is based on the predictions 131.

Methodology

FIG. 2 illustrates an example method for developing a model for analyzing big data sets, according to one or more embodiments. FIG. 3 illustrate an example method for utilizing a model to determine predictions for input variables provided with a big data set, according to one or more embodiments. In describing examples of FIG. 2 and FIG. 3, reference may be made to an example of FIG. 1 for purpose of illustrating a suitable component for performing a step or sub-step being described.

According to some embodiments, an iterative process is used to develop a model for analyzing big data sets. The development of the model can utilize training data, and specifically rows of training data that represent a big data set for analysis. The variables that can be used to develop the model include, for example, one or more of the number of rows, sum of each column, the sum of the product of the deviation from the mean of each pair of output columns, the sum of the deviation from the mean squared for each input column, and the sum of the product from the deviation of each column of the input versus output variables. These sums can be used to determine the corresponding parts of the model. By way of example, the sum of column 5 and the number of rows can be used to determine the mean of column 5. The sum of the product of the deviation from output column 5 and input column 2 and the number of rows can be used to calculate the covariance between those two columns. These examples can be expressed generally as:

$$\Sigma_{o,i} = \frac{\sum_{j=1}^{n}(x_o - \mu_o)(x_i - \mu_i)^T}{n}$$

Accordingly, the covariance of o,i is equal to the deviation from the mean of the respective columns over all the n rows. Similarly, the mean of the outputs and inputs are defined as follows:

$$\mu_i = \frac{\sum_{j=1}^{n} x_i}{n}$$

$$\mu_o = \frac{\sum_{j=1}^{n} x_o}{n}$$

A process begins with an initial model (210). During operation, model learning component 120 updates the model based on processing each row as described above. The updates to the model are based on the variables that can be used to determine the model's parameters. Each iteration of the system can thus "improve" the model in the sense the model is closer to convergence with each iteration.

The initial model can be chosen in several ways. In one implementation, the model learning component 120 implements a random selection for the model. In making the selection, the covariance matrices, class probabilities, and mean vectors can be chosen from a uniform distribution. Still further, the model learning component 120 can select the covariance matrices and class probabilities to be equal while the mean vectors are chosen to maximize the distance away from each other. In one aspect, the model learning component 120 can run multiple random initial models run to convergence, and the model that results in the highest likelihood can then be identifies the "best" one. Embodiments recognize that running multiple initial models to convergence increases the confidence that out of multiple runs, the system will find the "best" model (e.g., the one that results in the highest likelihood of the data given the model). The multiple random restarts can optionally be run in parallel.

Among other benefits, examples described herein scale linearly with the number of inputs. In this way, examples described herein provide a solution to the width problem of developing models for handling big data analysis, particularly in instances when the input variables are provided by a big data set. Specifically, examples described herein provide a model learning process to for developing models that can process big data sets (e.g., generate predictions), including when the big data sets are extremely wide (columns of ($0^5$) or more). As described with an example of FIG. 3, the resulting model can be developed to include subclasses for fitting to input data, so that the resulting model can be used to produce predictions that are more accurate.

With the initial model, training data can be used to iterate and develop the model (220). Typically, a row x is a vector which comprises both an input $x_o$ and an output portion $x_i$:

$$x = \begin{bmatrix} x_o \\ x_i \end{bmatrix}$$

Both the input and the output portion can be assumed to be column vectors.

The model comprises a set of classes (each class is denoted by a c), where each class is associated with the probability of the class, as denoted by p(c) and the following vectors and matrices for each class c:

$$\mu_c = \begin{bmatrix} \mu_{o,c} \\ \mu_{i,c} \end{bmatrix}$$

$$\Sigma_c = \begin{bmatrix} \Sigma_{o,c} & \Sigma_{o,i,c}^T \\ \Sigma_{o,i,c} & \Sigma_{i,c} \end{bmatrix}$$

$$\hat{\mu}_{o,c} = \mu_{o,c} + \Sigma_{o,i,c} \Sigma_{i,c}^{-1} (x_i - \mu_{i,c})$$

$$\hat{\Sigma}_{o,c} = \Sigma_{o,c} - \Sigma_{o,i,c} \Sigma_{i,c}^{-1} \Sigma_{o,i,c}^T$$

The assumption can be made that the input $x_i$ and output $x_o$ are both continuous and distributed as a multivariate normal distribution with a mean vector, y, and a covariance matrix $\Sigma_c$, one per class. The vector $\mu_{o,c}$ is the mean vector for the output for class c. The vector $\mu_{i,c}$ is the mean vector of the input for class c. The matrix $\Sigma_{o,c}$ is the covariance matrix for just the output for class c. The matrix $\Sigma_{i,c}$ is the covariance matrix for just the input for class c. In contrast, the matrix $\Sigma_{o,i,c}$ is the covariance matrix for the output versus the input for class c.

In developing the model, a probability distribution can be utilized for the model which subdivides the model into classes or subclasses (also known as mixtures) (230). Given these assumptions, the most likely output (i.e., the prediction) for an example x, and class c is the conditional mean $\hat{\mu}_{o,c}$, which is defined as above. The conditional covariance matrix $\hat{\Sigma}_{o,c}$ is similarly defined.

During operation, an embodiment provides that the most likely class for a set of training data is determined by probability distribution (240). Covariance matrices can be utilized for input/output variables in determining the probability distributions (242). In more detail, for a given row $x_i, x_o$ of training data, the model learning component 120 determines a c that maximizes $p(c|x_i,x_o)$, which by Bayes Theorem is defined as below (k is the total number of classes):

$$p(c \mid x_i, x_o) = \frac{p(x_i, x_o \mid c) p(c)}{\sum_{j=1}^{k} p(x_i, x_o \mid c_j) p(c_j)}$$

Since the denominator is a normalizing constant, a class c maximizes the numerator $p(x_i,x_o|c)p(c)$. A simpler form, one that can get rid of cumbersome multiplications and exponentials is to take the negative of the logs of the two operands. Thus, a c is selected that minimizes $-[\log(p(x_i, x_o|c)) + \log(p(c))]$.

According to an embodiment, a relationship between the input and output is modeled so that $p(x_i,x_o|c) = p(x_o|x_i,c)p(x_i|c)$. That is, $x_o$ depends on $x_i$ and rather than the other way around. Here $p(x_i|c)$ in its log form (with constants removed since we are maximizing) is defined as below using a standard multivariate normal distribution:

$$p(x_i \mid c) = \frac{1}{\sqrt{\det(2\pi \Sigma_{i,c})}} \exp\left[-\frac{1}{2}(x_i - \mu_{i,c}) \Sigma_{i,c}^{-1} (x_i - \mu_{i,c})^T\right]$$

$$\log(p(x_i \mid c)) = \frac{-\log\det(\Sigma_{i,c}) - (x_i - \mu_{i,c}) \Sigma_{i,c}^{-1} (x_i - \mu_{i,c})^T}{2}$$

Here logdet is the log-determinant function, which available in most programming languages and is generally more efficient to calculate than taking the log of the determinant.

The function $p(x_o|x_i,c)$ is similarly defined:

$$p(x_o \mid x_i, c) = \frac{1}{\sqrt{\det(2\pi \hat{\Sigma}_{o,c})}} \exp\left[-\frac{1}{2}(x_o - \hat{\mu}_{o,c})\hat{\Sigma}_{o,c}^{-1}(x_o - \hat{\mu}_{o,c})^T\right]$$

$$\log(p(x_o \mid x_i, c)) = \frac{-\text{logdet}(\hat{\Sigma}_{o,c}) - (x_o - \hat{\mu}_{o,c})\hat{\Sigma}_{o,c}^{-1}(x_o - \hat{\mu}_{o,c})^T}{2}$$

Hence c is selected that minimizes:

$$\frac{\text{logdet}(\Sigma_{i,c}) - (x_i - \mu_{i,c})\Sigma_{i,c}^{-1}(x_i - \mu_{i,c})^T +}{2}$$
$$\frac{\text{logdet}(\hat{\Sigma}_{o,c}) + (x_o - \hat{\mu}_{o,c})\hat{\Sigma}_{o,c}^{-1}(x_o - \hat{\mu}_{o,c})^T}{2} - \log(p(c))$$

This equation represents that the class c is a function of the covariance of the mean for the class, the covariance of the input for the class, the weighted distance from the mean, and the probability of the class.

Examples recognize, however, that $\Sigma_{i,c}^{-1}$ is expensive to compute because it involves expensive inversions, log-determinant calculations, both which can take $O(n^3)$ time. Accordingly, matrix inversion logic can be used to significantly reduce the computational expense associated with conventional approaches for performing similar calculations.

In one implementation, the model learning component 120 implements matrix inversion logic 122 to calculate the covariance matrix for the input variables (250), in order to calculate probability determinations based on the selected model. In one implementation, matrix inversion logic 122 includes an assumption is made that a matrix representation of the input variables (provided with the training data set) includes only diagonal entries. More specifically, an assumption can be made that $\Sigma_{i,c}$ is a diagonal matrix. This assumption can facilitates matrix inversion and determinant calculation in the face of a big data set. Note that matrix inversion and determinant calculation typically require $O(n^3)$ time. More specifically:

$$\Sigma_{i,c} = \begin{bmatrix} \sigma_{i_1,c}^2 & \cdots & 0 \\ \vdots & \ddots & \vdots \\ 0 & \cdots & \sigma_{i_n,c}^2 \end{bmatrix}$$

This matrix $\Sigma_{i,c}$ contains only the variance of the inputs along the diagonal and zeros elsewhere (e.g., on the off-diagonal elements). That is, this matrix does not contain covariances. Hence:

$$\Sigma_{i,c}^{-1} = \begin{bmatrix} \frac{1}{\sigma_{i_1,c}^2} & \cdots & 0 \\ \vdots & \ddots & \vdots \\ 0 & \cdots & \frac{1}{\sigma_{i_n,c}^2} \end{bmatrix}$$

In other words, the matrix $\Sigma_{i,c}$ can be inverted simply by inverting the diagonal elements, which is an $O(n)$ operation. Thus the complexity can be reduced from an $O(n^3)$ inversion operation to an $O(n)$ inversion operation, which enables examples described herein to scale up for big data applications (e.g., predictions). The calculation for the determinant is similar and is also $O(n)$ in complexity:

$$\det(2\pi \Sigma_{i,c}) = 2\pi \mathring{A}_{k=1}^n \sigma_{i_n,c}^2$$

Assuming g output variables and n input variables and the above diagonal form of the input covariance matrix, the complexity of the multiplication operations required to compute the $\hat{\mu}_{o,c}$ are as follows: the first multiply is $O(gn)$, since the diagonal elements in the $\Sigma_{i,c}$ matrix only need to be multiplied; the second multiple, which is for a g×n matrix with an n×1 vector is also $O(gn)$. Thus, the total complexity of the multiplies is $O(gn)$. Since g<<n, this means the total complexity of the multiplies is $O(n)$.

Once the class is selected for the training row, the model learning component 120 updates the model (260). In particular, the variables of the model can be updated based on a row of training data 114. Each row's impact on the covariance matrices and mean vectors can be calculated as a running sum. Similarly, each row's assignment to a class can be calculated as a running sum for a count of the number of rows assigned to each class.

According to an embodiment, a determination can be made as to whether the model has converged, or is stable (265). The stability of the model can be measured in different ways. The determination of stability can be based on one or more of (i) parameters that change very little (i.e., less than a defined threshold) between iterations, (ii) a likelihood of the data given for the model changes very little between iterations, and/or (iii) that the assignments of rows to classes change very little (i.e., less than a defined threshold) between iterations. In either case, the system is run to convergence of a stable model. If the model is not converged, then the process is repeated at (210). Else the model can be deemed as complete (270).

In one embodiment, the model can include missing values which can be inferred. Generally, missing data is an issue that plagues machine learning systems. For example, a particular column in a particular row might be missing because that columns value might not have been measured when the training data was sampled. Determining quantities such as the mean or covariance based only on the non-missing values can exaggerate the effects of the non-missing values. Typical approaches to missing data include removing the incriminating row or replacing the incriminating column by the average value. Neither approach is satisfactory from the point of view of machine learning: the first method removes valuable data involving the non-missing columns; the second method skews the data for that column towards the mean, which is clearly wrong. Embodiments described herein recognize that probabilistically, the correct way to deal with missing data is to infer the missing columns for a row based on the non-missing columns for that row. Unfortunately, when the data is wide (e.g., $10^4$ columns), that probabilistically correct method is infeasible. This is because that inference is based on a covariance matrix between all the input variables (as well as the output variables) and with n input variables, that inference can take $O(n^3)$ time from the inversion calculation.

In contrast, embodiments described herein avoid the computationally expensive inverse operation by basing the inference on the missing variable values on covariance between the output variables and the input variables, the mean output vector, and the mean input vector as follows. With reference to an example of FIG. 1, the model learning component 130 can implement steps as described for determining the missing values. More specifically, the model learning component 130 implements a preliminary step to find the most likely class c, as described above with an example of FIG. 2. This step may involve all the non-missing variables. In an implementation in which the task is to predict an output given the inputs, every row in the training data typically includes the output variable values as well as some inputs.

A next step is to infer the missing inputs $i_m$ from the non-missing output $x_o$:

$$\hat{\mu}_{i_m,c} = \mu_{i_m,c} + \Sigma_{o,i_m,c}^T \Sigma_{o,c}^{-1}(x_o - \mu_{o,c})$$

This is similar to predicting the output from an input, given a class, except an input is predicted from the output. There is still an inversion for $\Sigma_{o,c}^{-1}$, however, this is $O(g^3)$ instead of $O(n^3)$. Since $g \ll n$, the complexity of this inversion is reasonable. Furthermore, the multiplication operations are low-order. In short, embodiments described herein provide for inferring missing data in a manner is more efficient than conventional approaches. While some sacrifice accuracy may be sacrificed as a result of the non-missing inputs being taken into account when determining $\hat{\mu}_{i_m,c}$, the end result is that the likely value is determined given the outputs, this making the trade-off worthwhile. The most likely class can involve utilizing the non-missing input and output columns.

With reference to FIG. 3, system 100 receives and processes a big data set (310). The big data set 115 can include input variables for which predictive output is to be determined. One or more input interfaces 110 can, for example, operate to receive data sets for analysis from a variety of sources, such as from network services, websites, individual devices etc. Still further, the big data set 115 can be provided as an input from a single source, such as a user.

Generally, a prediction problem involves predicting a small number of outputs (typically a single one) from a large number of inputs. In this respect, prediction can be viewed as condensing the inputs into a small number of outputs. For example, one might want to predict the geographic location of a person based on the distance to other people whose location is known. The prediction might involve two outputs (latitude and longitude) and the inputs might involve thousands of inputs, corresponding to the distance to other people whose location is known. Examples described herein recognize that it is the number of inputs that presents challenges to prediction systems rather than the size of the outputs. In mathematical terms, with n inputs and m outputs m<<n. Examples described herein can be viewed as solving the problem of prediction when m<<n: when the number of inputs far outnumbers the number of outputs.

As noted, x can be represented as a vector which comprises an input $x_o$ and an output portion $x_i$:

$$x = \begin{bmatrix} x_o \\ x_i \end{bmatrix}$$

Both the input and the output portion are column vectors. In a prediction problem, the output is predicted from the input. The output $x_o$ is selected for an input $x_i$ such that $p(x_o | x_i)$ is maximized. In order to calculate this, some assumptions about the input and output are made. Again, one assumption that can be made is that $x_o$ and $x_i$ are both continuous and distributed as a multivariate normal distribution with a mean vector $\mu$ and a covariance matrix $\Sigma$, which are conformably partitioned as follows:

$$\mu = \begin{bmatrix} \mu_o \\ \mu_i \end{bmatrix}$$

$$\Sigma = \begin{bmatrix} \Sigma_o & \Sigma_{o,i}^T \\ \Sigma_{o,i} & \Sigma_i \end{bmatrix}$$

The vector $\mu_o$ is the mean vector for the output. The vector $\mu_i$ is the mean vector of the input. The matrix $\Sigma_o$ is the covariance matrix for just the output. The matrix $\Sigma_i$ is the covariance matrix for just the input. In contrast, the matrix $\Sigma_{o,i}$ is the covariance matrix for the output vs. the input. Most discrete inputs and outputs can be converted to a set of continuous outputs as follows. Each discrete value of an input (or output) can be represented by a distinct input (or output) attribute with a continuous value where 1 represents the presence of that attribute and 0 the lack of that.

Given these assumptions, the most likely output (i.e., the prediction) for an example $x_i$ is the conditional mean $\hat{\mu}_o$, which is defined as follows:

$$\hat{\mu}_o = \mu_o + \Sigma_{o,i} \Sigma_i^{-1}(x_i - \mu_i)$$

The conditional covariance matrix of that most likely output is defined as follows:

$$\hat{\Sigma}_o = \Sigma_o - \Sigma_{o,i} \Sigma_i^{-1} \Sigma_{o,i}^T$$

A model is implemented that includes one or more classes or subclasses (320). In one implementation, the model implementation component 130 implements a model 121. For example, as described with FIG. 2, a model can be developed that includes multiple subclasses. According to some embodiments, a probability distribution is utilized for the model which subdivides the model into "classes" (also known as mixtures) that can be discovered during model-building (e.g., see FIG. 2) and subsequently used for prediction (322). These classes are similar to hidden units in neural nets and can be viewed as a way to fit a probabilistic surface better through one or more sub-surfaces. Mixtures are common in clustering application such as in the Expectation-Maximization procedure. Embodiments recognize the utility of mixtures for purpose of determining predictions in big data sets. Additionally, embodiments recognize that an arbitrary number of mixtures can be used to fit any probability distribution function.

To capture the idea of classes, all of the above expressions (except the vector x) are additionally subscripted with a class c, to provide a definition of a model, as follows:

$$\mu_c = \begin{bmatrix} \mu_{o,c} \\ \mu_{i,c} \end{bmatrix}$$

$$\Sigma_c = \begin{bmatrix} \Sigma_{o,c} & \Sigma_{o,i,c}^T \\ \Sigma_{o,i,c} & \Sigma_{i,c} \end{bmatrix}$$

$$\hat{\mu}_{o,c} = \mu_{o,c} + \Sigma_{o,i,c} \Sigma_{i,c}^{-1}(x_i - \mu_{i,c})$$

$$\hat{\Sigma}_{o,c} = \Sigma_{o,c} - \Sigma_{o,i,c} \Sigma_{i,c}^{-1} \Sigma_{o,i,c}^T$$

A most likely answer is determined for each class c, based on the probability of the individual class (330). Each class c also includes a probability of the class, as denoted by p(c).

Given k such mixtures, the average most likely answer $\bar{\mu}_o$ for a given $x_i$ is defined as follows:

$$\bar{\mu}_o = \Sigma_{j=1}^k p(c_j|x_i) \hat{\mu}_{o,c_j}$$

That is, this expression weights the most likely answer for each class by the probability of the class. This average is a reasonable guess for the output given a test case. Here $p(c_j|x_i)$ is defined as below by using Bayes' Theorem:

$$p(c|x_i) = \frac{p(x_i|C)p(c)}{\sum_{j=1}^k p(x_i|c_j)p(c_j)}$$

Where $p(x_i|c_j)$ is defined as below using a standard multivariate normal distribution:

$$p(x_i|c) = \frac{1}{\sqrt{\det(2\pi\Sigma_{i,c})}} \exp\left[-\frac{1}{2}(x_i - \mu_{i,c})\Sigma_{i,c}^{-1}(x_i - \mu_{i,c})^T\right]$$

Similarly, the average covariance $\Sigma_o$ of that answer is defined as follows:

$$\Sigma_o = \Sigma_{j=1}^k p(c_j|x_i) \hat{\Sigma}_{o,c_j}$$

These two answers—the average mean and average covariance—provide both (i) a value to expect, and (ii) how that expected value varies, given k classes and an input vector $x_i$.

In determining the most likely answer for each class c, matrix inversion logic may be employed (332). For example, the model implement component 130 can utilize matrix inversion logic 132 in order to determine respective probabilities of the individual classes. In one implementation, a set of input variables for the big data set are represented, for each of one or more classes of the model, as a matrix with non-zero values that are only provided as diagonal entries. Embodiments recognize that one problem is that $p(x_i|c)$ is expensive to compute because it involves expensive inversions, determinant calculations, multiplications, and exponentials. In order to facilitate computational expense, embodiments further implement the matrix $\Sigma_{i,c}$ to be a diagonal matrix, which can facilitate matrix inversion and determinant calculation in the face of big data. In general, the matrix inversion and determinant calculation typically require $O(n^3)$ time. More specifically:

$$\Sigma_{i,c} = \begin{bmatrix} \sigma_{i_1,c}^2 & \cdots & 0 \\ \vdots & \ddots & \vdots \\ 0 & \cdots & \sigma_{i_n,c}^2 \end{bmatrix}$$

This matrix $\Sigma_{i,c}$ contains only the variance of the inputs along the diagonal and zeros elsewhere (i.e., on the off-diagonal elements). That is, this matrix does not contain covariances. Hence:

$$\Sigma_{i,c}^{-1} = \begin{bmatrix} \frac{1}{\sigma_{i_1,c}^2} & \cdots & 0 \\ \vdots & \ddots & \vdots \\ 0 & \cdots & \frac{1}{\sigma_{i_n,c}^2} \end{bmatrix}$$

Embodiments recognize that the matrix $\Sigma_{i,c}$ can be inverted simply by inverting the diagonal elements, which is an O(n) operation. Thus the complexity can be reduced from an $O(n^3)$ inversion operation to an O(n) inversion operation, which enables this method to scale up for big data predictions. The calculation for the determinant is similar and is also O(n) in complexity:

$$\det(2\pi\Sigma_{i,c}) = 2\pi Å_{k=1}^n \sigma_{i_n,c}^2$$

Assuming g output variables and n input variables and the above diagonal form of the input covariance matrix, the complexity of the multiplication operations required to compute the $\hat{\mu}_{o,c}$ are as follows: the first multiply is O(gn), since the diagonal elements in the $\Sigma_{i,c}$ matrix only need to be multiplied; the second multiple, which is for a g×n matrix with an n×1 vector is also O(gn). Thus the total complexity of the multiplies is O(gn). Since g<<n, this means the total complexity of the multiplies is O(n).

Embodiments further recognize one potential problem with the approach provided above is that the numbers in the numerator of the divide operation for $p(c_j|x_i)$ are likely to be small and cause an underflow. Similarly, the multiply operations for the $\det(2\pi\Sigma_{i,c})$ might cause an overflow. Both of these can occur because of a large number of inputs. The square root and the exponential function are also somewhat computationally expensive.

According to an embodiment, a most likely class for each input value is determined (340). Given an input $x_i$, a class c is selected that maximizes the probability of the output. Since the most likely output for a given class is always its mean, an output is not necessarily selected. A class c is selected that maximizes the probability of $\mu_{o,c_j}$ given an input $x_i$. To find the class c that maximizes probability of the input $x_i$ the following equation can be maximized:

$$p(c|x_i) = \frac{p(x_i|c)p(c)}{\sum_{j=1}^k p(x_i|c_j)p(c_j)}$$

Since the denominator is a normalizing constant, a class c is selected that maximizes $p(x_i|c)p(c)$, where $p(x_i|c)$ is defined as below:

$$p(x_i|c) = \frac{1}{\sqrt{\det(2\pi\Sigma_{i,c})}} \exp\left[-\frac{1}{2}(x_i - \mu_{i,c})\sum_{i,c}^{-1}(x_i - \mu_{i,c})^T\right]$$

Embodiments further recognize that the probability peaks at the conditional mean given the input and class. The peak value at this point is given by:

$$\frac{1}{\sqrt{\det(2\pi\hat{\Sigma}_{o,c})}}$$

Where:

$$\hat{\Sigma}_{o,c} = \Sigma_{o,c} - \Sigma_{o,i,c}\Sigma_{i,c}^{-1}\Sigma_{o,i,c}^T$$

A class c for an input $x_i$ is selected such that the following expression is maximized:

$$\frac{1}{\sqrt{\det(2\pi[\Sigma_{o,c} - \Sigma_{o,i,c}\Sigma_{i,c}^{-1}\Sigma_{0,i,c}^T])}}$$

-continued $$\frac{1}{\sqrt{\det(2\pi\Sigma_{i,c})}}\exp\left[-\frac{1}{2}(x_i-\mu_{i,c})\Sigma_{i,c}^{-1}(x_i-\mu_{i,c})^T\right]p(c)$$

The $2\pi$ can be removed since it is a constant not dependent on c or $x_i$:

$$\frac{1}{\sqrt{\det(\Sigma_{o,c}-\Sigma_{o,i,c}\Sigma_{i,c}^{-1}\Sigma_{o,i,c}^T)}}$$

$$\frac{1}{\sqrt{\det(\Sigma_{i,c})}}\exp\left[-\frac{1}{2}(x_i-\mu_{i,c})\Sigma_{i,c}^{-1}(x_i-\mu_{i,c})^T\right]p(c)$$

Choosing a c for an input $x_i$ the same as choosing a class c for an input $x_i$ such that the following expression is minimized:

$$-\log\left(\frac{1}{\sqrt{\det(\Sigma_{o,c}-\Sigma_{o,i,c}\Sigma_{i,c}^{-1}\Sigma_{o,i,c}^T)}}\right.$$
$$\left.\frac{1}{\sqrt{\det(\Sigma_{i,c})}}\exp\left[-\frac{1}{2}(x_i-\mu_{i,c})\Sigma_{i,c}^{-1}(x_i-\mu_{i,c})^T\right]p(c)\right)$$

This expression is equal to:

$$\text{logdet}(\Sigma_{o,c}-\Sigma_{o,i,c}\Sigma_{i,c}^{-1}\Sigma_{o,i,c}^T)+$$
$$\frac{\text{logdet}(\Sigma_{i,c})+(x_i-\mu_{i,c})^T\Sigma_{i,c}^{-1}(x_i-\mu_{i,c})}{2}-\log(p(c))$$

Here logdet is the log-determinant function, which available in most programming languages and is considerably more efficient to calculate than taking the log of the determinant.

According to the equation provided above, the choice of the class c is a function of the covariance of the mean for the class, the covariance of the input for the class, the weighted distance from the mean, and the probability of the class. Note that the first two expressions in the numerator can be pre-computed for any set of input columns in i, class c and output columns o. Let $$K_{o,i,c}=\text{logdet}(\Sigma_{o,c}-\Sigma_{o,i,c}\Sigma_{i,c}^{-1}\Sigma_{o,i,c}^T)+\text{logdet}(\Sigma_{i,c})$$

In other words, $K_{o,i,c}$ is not dependent on a particular input $x_i$ and hence can be pre-computed for any set of input and output columns over all classes. If the input and output columns are only known at prediction time, $K_{o,i,c}$ can easily be computed in real-time as the operations are all low-order complexity, as detailed above. Similarly, log(p(c)) can be pre-computed for greater prediction speed.

Assuming that the class probabilities are equal, a class c is selected for an input i such that the following expression is minimized:

$$K_{o,i,c}+(x_i-\mu_{i,c})^T\Sigma_{i,c}^{-1}(x_i-\mu_{i,c})$$

Further assuming that $\Sigma_{i,c}=I$ for every class c, this expression simplifies to:

$$K_{o,i,c}+(x_i-\mu_{i,c})^T(x_i-\mu_{i,c})$$

Further yet assuming that $\Sigma_{o,i,c}=0$ and $\Sigma_{o,c}=I$ for every class c, this expression simplifies to:

$$(x_i-\mu_{i,c})^T(x_i-\mu_{i,c})$$

Embodiments recognize that under this final simplifying assumption, the idea is to choose a class c whose means are closest to the input. This is similar to choosing a class for the k-means procedure. The downside of this expression is that it the resulting variance of the most likely output (i.e., the mean) is not considered.

Embodiments recognize that with minimal additional computational costs, a more accurate answer (as displayed above) is to choose the class c that minimizes:

$$\frac{K_{o,i,c}+(x_i-\mu_{i,c})^T\Sigma_{i,c}^{-1}(x_i-\mu_{i,c})}{2}-\log(p(c))$$

Once this class is chosen, then the conditional mean for that class given the input can be returned.

Once a most likely class is determined, a prediction for the output variables can be determined (350). In this way, an output is determined based on maximizing the probability of the output given a class and the input (360).

Computer System

Figure 4:
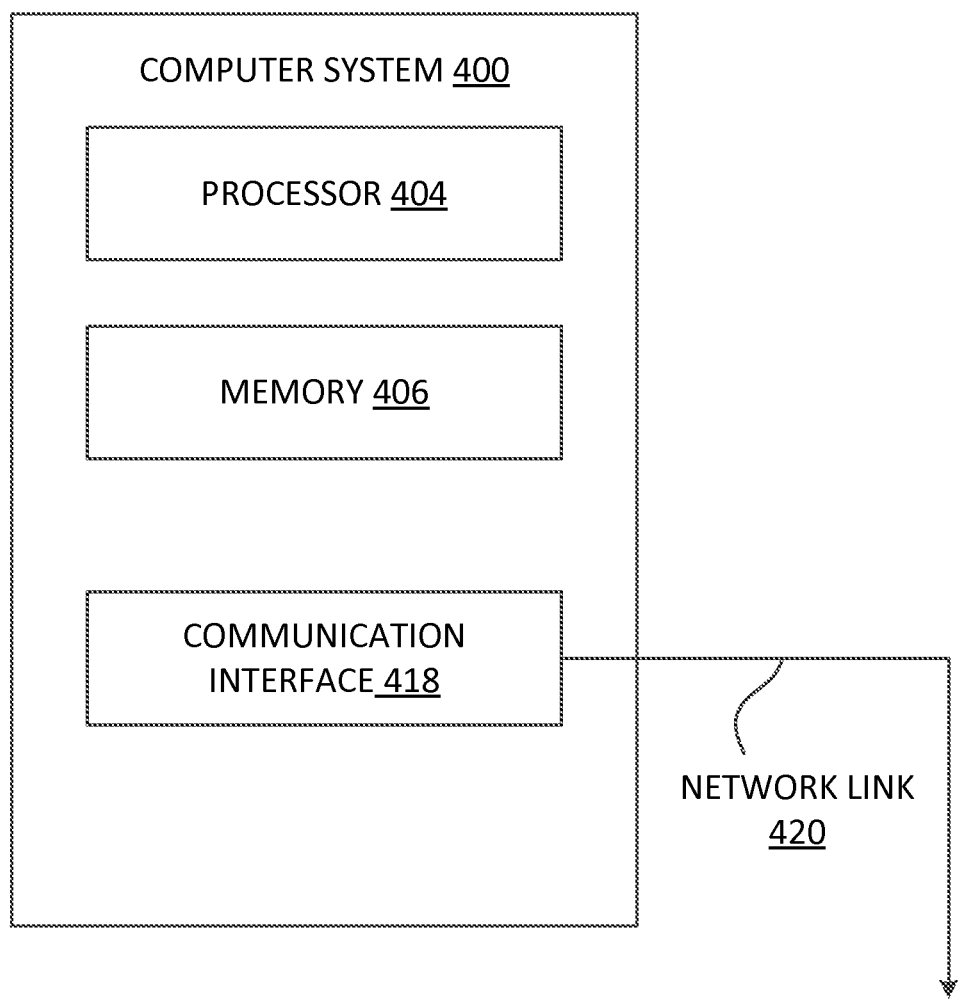
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, system 100 may be implemented using one or more computer systems such as described by FIG. 4. Furthermore, a method such as described by each of an example of FIG. 2 and FIG. 3 can be implemented using a system such as described with FIG. 4.

In an embodiment, computer system 400 includes processor 404, memory 406 (including non-transitory memory), storage device 410, and communication interface 418. Computer system 400 includes at least one processor 404 for processing information. Computer system 400 also includes a memory 406, such as a random access memory (RAM) or other dynamic storage device, for storing information and instructions to be executed by processor 404. The memory 406 also may be used for storing temporary variables or other intermediate information during execution of instructions to be executed by processor 404. Computer system 400 may also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one implementation, memory 406 may store instructions for implementing functionality such as described with an example of FIG. 1, or implemented through an example method such as described with FIG. 2 or FIG. 3. Likewise, the processor 404 may execute the instructions in providing functionality as described with FIG. 1, or performing operations as described with an example method of FIG. 2 or FIG. 3.

Embodiments described herein are related to the use of computer system 400 for implementing the techniques described herein. According to one embodiment, those techniques are performed by computer system 400 in response to processor 404 executing one or more sequences of one or more instructions contained in memory 406. Such instructions may be read into memory 406 from another machine-readable medium, such as storage device 410. Execution of the sequences of instructions contained in memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for determining one or more predictions for a big data set, the method being implemented by one or more processors and comprising:
   receiving at least a portion of the big data set;
   implementing a model that includes one or more classes, the model associating a probability with each class of the one or more classes;
   representing, for each of the one or more classes of the model, a set of input variables of the big data set as a matrix with non-zero values only provided as diagonal entries;
   determining a most likely class for each input variable based at least in part on inverting the matrix; and
   determining one or more predictions for one or more output variables based at least in part on the most likely class of one or more input variables from the set of input variables.

2. The method of claim 1, wherein the model is based at least in part on (i) a covariance matrix amongst output variables a set of output variables for each class of the one or more classes, and (ii) a covariance matrix between the output variables the input variables for each class of the one or more classes.

3. The method of claim 2, wherein the matrix of the set of input variables is also a covariance matrix.

4. The method of claim 1, further comprising generating an output based on the one or more predictions.

5. A method for developing a model for analyzing a big data set, the method being implemented by one or more processors and comprising:
   (a) determining a set of classes for the model based on a probability distribution;
   (b) determining a most likely class for a set of training data;
   wherein determining the most likely class includes (i) representing, for each of the one or more classes of the model, a set of input variables of the model as a matrix with non-zero values only provided as diagonal entries, and (ii) inverting the matrix; and
   (c) updating one or more input variables of the model using the set of training data and the most likely class determined for the training data.

6. The method of claim 5, wherein the set of input variables are represented as a covariance matrix with the non-zero values only provided as diagonal entries.

7. The method of claim 5, wherein (a) through (c) are repeated until the model is converged.

8. The method of claim 7, further comprising determining when the model is converged by determining one or more of (i) a change in a value of one or more of the input parameters is less than a threshold between one or more successive iterations of (a) through (c); or (ii) a class assigned to a given set of training data remains the same between one or more successive iterations of (a) through (c).

9. The method of claim 5, further comprising inferring a set of input variables that are missing from the model based on input variables that are not missing in the model.

10. A non-transitory computer-readable medium that stores instructions, which when executed by one or more processors, cause the one or more processors to perform operations that include:
    receiving at least a portion of a big data set;
    implementing a model that includes one or more classes; the model associating a probability with each class of the one or more classes;
    representing, for each of the one or more classes of the model, a set of input variables of the big data set as a matrix with non-zero values only provided as diagonal entries;
    determining a most likely class for each input variable based at least in part on inverting the matrix; and
    determining one or more predictions for one or more output variables based at least in part on the most likely class of one or more input variables from the set of input variables.

11. The computer-readable medium of claim 10, wherein the model is based at least in part on (i) a covariance matrix amongst output variables a set of output variables for each class of the one or more classes, and (ii) a covariance matrix between the output variables the input variables for each class of the one or more classes.

12. The computer-readable medium of claim 11, wherein the matrix of the set of input variables is also a covariance matrix.

13. The computer-readable medium of claim 10, further comprising instructions that, when executed by one or more processors, cause the one or more processors to perform operations that include generating an output based on the one or more predictions.

* * * * *